United States Patent [19]
Mills et al.

[11] Patent Number: 5,688,164
[45] Date of Patent: Nov. 18, 1997

[54] RECTUM SEPARATING

[75] Inventors: Edward Graham Mills; Andrew Leslie Finney, both of Cannon Hill; Albert James Vick; Thomas William Prisk, both of Rocklea, all of Australia

[73] Assignee: Commonwealth Scientific and Industrial Research Organisation, Sydney, Australia

[21] Appl. No.: 624,430
[22] PCT Filed: Sep. 26, 1995
[86] PCT No.: PCT/AU95/00637
  § 371 Date: Jul. 23, 1996
  § 102(e) Date: Jul. 23, 1996
[87] PCT Pub. No.: WO96/09770
  PCT Pub. Date: Apr. 4, 1996
[51] Int. Cl.⁶ .............................. A22C 21/06; A23B 5/00
[52] U.S. Cl. .................................. 452/122; 452/176
[58] Field of Search ........................ 452/122, 120, 452/176

[56] References Cited

U.S. PATENT DOCUMENTS

| | | | |
|---|---|---|---|
| 4,023,237 | 5/1977 | Meyn | 452/122 |
| 5,123,871 | 6/1992 | Van Den Nicuwelaar et al. | 452/122 |
| 5,133,686 | 7/1992 | Van Den Nicuwelaar et al. | 452/122 |
| 5,474,492 | 12/1995 | Aubert | 452/176 |
| 5,580,304 | 12/1996 | Bleth et al. | 452/122 |

FOREIGN PATENT DOCUMENTS

| | | |
|---|---|---|
| 0 620 976 | 4/1994 | European Pat. Off. |
| 258627 | 4/1913 | Germany ........... 452/176 |
| 92/13458 | 8/1992 | WIPO. |
| 93/07759 | 4/1993 | WIPO. |
| 94/15471 | 7/1994 | WIPO. |

*Primary Examiner*—Willis Little
*Attorney, Agent, or Firm*—Lowe, Price, LeBlanc & Becker

[57] ABSTRACT

A process and apparatus are described for separating and closing the rectum (13) of a slaughtered animal carcass (10). A gripping apparatus (20) is first located inside a closure bag (15). The gripping apparatus (20) comprises a bung member (21) which is inserted into the rectum (13) past the anus (11) and a clamp (25) which is advanced to clamp the constricted sphincter muscle tissues (19) against the bung member without perforating the bag. The gripping apparatus (20) is retracted to tension and straighten the rectum (13) while surround tissues are cut. Then bagging means (30) advances the closure bag (15) so as to surround the rectum and the bag (15) is constricted by a ring (31) around the rectum (13) at a location spaced inwardly of the anus (11).

16 Claims, 6 Drawing Sheets

RECTUM SEPARATING

This invention relates to a process and apparatus for separating and closing the rectum of a slaughtered animal carcass.

The separating of the rectum and closing or "bagging" of the anus is presently a manual operation in the case of cattle and also usually in the case of other slaughtered animals. Typically, the carcass is hanging from an overhead rail by hooks attached to the bovine's rear legs. The slaughterman stands on an elevated floor which is at a height such that the anus of the bovine is at approximately waist level. The speed of the conveyor is such that a new animal passes in front of the slaughterman between every 20 and 50 seconds, depending upon the schedule for the abattoir.

The slaughterman's first task is to separate the rectum. Typically, the flesh next to the anus is gripped with one hand and the knife held with the other. The hold on the anus is to tension the rectum away from the knife. The first series of cuts is around the inner surface of the pelvic bone to a depth of approximately 80 mm; several strokes are needed to completely circumscribe the anus, rectum and urogenital organs. The next series of cuts are required to separate the organs to depths approaching 300 mm; the knife hand by this stage is within the pelvis. The time taken to perform the separating task is about 10 seconds.

The stage after the separation of the rectum is the sealing and tying of the rectum. In most slaughter-houses, a plastic bag is used to cover the separated rectum and associated tissue. The bag can then be tied onto the tissue using various devices, such as string, elastic bands or an elastrator ring which is a type of food-approved O-ring which must be expanded using pneumatic pliers. The time taken for the sealing is about 10 seconds.

The slaughterman is then required to sterilise his knife and clean any contamination from his hands and arms.

A mechanised or partially mechanised process is known for use with smaller animals, particularly pigs. This mechanised operation involves holding the anus against movement by application of a vacuum, followed by advancing a tubular saw blade which cuts around the rectum. The strength of the hold by use of a vacuum is not great and the process and apparatus is unsuitable for larger animals, particularly cattle.

It is an object of the present invention to provide a process and apparatus for effectively separating and closing the rectum of a slaughtered animal carcass.

It is a further and preferred object to provide a method and apparatus for separating and closing the rectum of a slaughtered animal carcass which is capable of at least partial mechanisation.

According to the present invention there is provided a process for separating and closing the rectum of a slaughtered animal carcass, the process comprising the steps of:
- locating a closure bag over a gripping apparatus so that the gripping apparatus is located in the closed end of the bag,
- gripping tissues in the region of the anus of the carcass by operation of the gripping apparatus acting through the bag but without perforating the bag,
- cutting tissues around the rectum to a depth inside the pelvic cavity of the carcass without piercing the rectum,
- advancing the closure bag so as to surround the rectum where the tissues have been cut and constricting the bag around the rectum at a location spaced inwardly of the anus so as to constrict the rectum whereby the bag encloses the anus and a terminal end section of the rectum, and
- releasing the gripping apparatus enabling the bagged anus and terminal end section of the rectum to enter into the pelvic cavity of the carcass for removal together with other viscera without discharge from the anus contaminating the carcass.

The step of cutting tissues may comprise manually cutting tissues around the rectum by manual operation of a cutting tool, e.g. by a slaughterman using a knife. Alternatively the cutting may be carried out by mechanically advancing and operating a cutting means such as a powered cutting blade or saw so as to cut tissues around the rectum to a predetermined depth inside the pelvic cavity.

The process may include the further step of applying longitudinal tension to the rectum by partial retraction of the gripping apparatus subsequent to the step of gripping tissues so as to thereby straighten the path of the rectum and minimise lateral movement of the rectum during the step of cutting tissues. The application of tension is preferred whether the cutting operation is a manual or mechanised process. The retraction of the gripping apparatus may continue until a predetermined magnitude of longitudinal tension is applied, or until a predetermined linear extent of retraction is reached.

According to the present invention there is also provided an apparatus for separating and closing the rectum of a slaughtered animal carcass, the apparatus including:
- a gripping apparatus over which a closure bag can be located so that the gripping apparatus is located at the closed end of the bag, the gripping apparatus being operable to grip tissues in the region of the anus of the carcass acting through the bag but without perforating the bag,
- bagging means for advancing the closure bag so as to surround the rectum where tissues around the rectum have been cut to a depth inside the pelvic cavity of the carcass without piercing the rectum, whereby the bag can be constricted around the rectum at a location spaced inwardly of the anus so as to thereby constrict the rectum whereby the bag encloses the anus and a terminal end section of the rectum,
- the gripping apparatus being releasable allowing the bagged anus and terminal end section of the rectum to enter deeper into the pelvic cavity of the carcass for removal together with other viscera without discharge from the anus contaminating the carcass.

In one embodiment of the apparatus, the gripping apparatus comprises a bung member and a clamp, the bung member being arranged to be inserted into the rectum past the anus to a depth so that sphincter muscle tissues constrict behind the bung member and the clamp being advanceable from an initial retracted position to a clamping position in which it clamps the constricted sphincter muscle tissues against a rear portion of the bung member. The bung member may have a generally conical shaped head having a rounded nose, the head being mounted on a shaft, the head being inserted in use through the anus into the rectum without piercing the anal canal walls, the head of the bung member having a back face defining a shoulder so that after the head has been inserted to a sufficient depth into the rectum, the sphincter muscle tissues constrict around the shaft behind the shoulder. The clamp may be generally annular in shape so as to clamp the constricted sphincter muscle tissues against the shoulder around substantially the entire periphery of the shoulder.

Advancing means may be operative, after the bag has enclosed the anus and terminal end section of the rectum and has been constricted around the rectum, to advance the bung member and clamp generally in the cranial direction so as to push the bagged anus and end section of the rectum through the pelvic cavity towards the bulk of the abdominal viscera of the carcass.

The apparatus may include cutting means for mechanically cutting the tissues around the rectum to a predetermined depth inside the pelvic cavity of the carcass. The cutting means may include a dorsal cutter coaxially mounted with the gripping apparatus and movable to advance past the gripping apparatus without contacting the closure bag so as to cut tissues of the carcass in an arc between the rectum and the vertebrae, the cutting means also including a ventral cutter movable to advance past the gripping apparatus and operative to cut tissues in an arc between the rectum and the pubis. The dorsal and ventral cutters are preferably advanced to perform their respective cutting operations sequentially, although simultaneous operation of the cutters may be possible. In the preferred sequential cutting mode, the gripping apparatus may be movable in the ventral direction by a short distance before advancement of the dorsal cutter so as to thereby move the rectum in that direction and increase the separation between the rectum and the vertebrae enabling the dorsal cutter to be advanced with a reduced possibility of the dorsal cutter contacting and piercing the rectum at the dorsal side of the rectum; the gripping apparatus furthermore being movable in the dorsal direction by a short distance before advancement of the ventral cutter so as to thereby move the rectum in that direction and increase the separation between the rectum and the pubis thereby enabling the ventral cutter to be advanced with a reduced possibility of the ventral cutter contacting and piercing the rectum at the ventral side of the rectum.

The bagging means may surround the gripping apparatus and may locate and hold the bag during the operation of the gripping apparatus to grip tissues in the region of the anus of the carcass, the bagging means being advanceable past the gripping apparatus and into the region where the tissues have been cut so that the bag inverts as it is being advanced while the closed end of the bag remains gripped at the anus by the gripping apparatus. In a preferred embodiment, the bagging means includes a bagging sleeve coaxially mounted with the gripping apparatus and mounted for selective advancing movement past the gripping apparatus, whereby the closure bag can be initially located so as to enclose the gripping apparatus and to extend along outside the bagging sleeve with the open top of the bag being clamped by a bag clamp at a point along the length of the sleeve spaced from the end of the sleeve nearer the gripping apparatus, the bag clamp being releasable when the bagging sleeve is advanced to enable the bag to slide back along the bagging sleeve as it is being inverted to enclose the rectum.

The bagging means preferably further includes a restricting means operative to apply to the rectum a restricting device to cause restriction of the rectum at the point spaced from the anus after the bag has been located around the rectum. The restricting device is preferably a restricting ring and the restricting means comprises means for installing the restricting ring which is initially located at the end of the bagging sleeve closest to the gripping apparatus when the bagging means is fully retracted but which is released by the restricting means when the bagging sleeve is fully extended and the bag is located around the anus and end section of the rectum so that the ring thereby tightly clamps the bag to the rectum and constricts the rectum at that point.

After the bagging of the rectum and closing of the bag, the bagged rectum may be allowed to fall deeper into the pelvic cavity, particularly if the carcass is suspended by the hind legs. Alternatively the bung member and clamp may be further advanced to push the bagged rectum through the pelvic cavity towards the bulk of the abdominal viscera. The gripping apparatus can then be released, by retracting the clamp from the bung member in the preferred embodiment, thereby releasing the bagged anus and terminal section of the rectum.

Possible and preferred features of the present invention will now be described with particular reference to the accompanying drawings. However it is to be understood that the features illustrated in and described with reference to the drawings are not to be construed as limiting on the scope of the invention. In the drawings.

The rectum separating, closing and bagging process will be described with reference to the apparatus depicted in the drawings.

The apparatus includes a gripping apparatus 20 over which a closure bag 15 is first located. The gripping apparatus 20 comprises a conical head 21 with a rounded nose 22 and rear shoulder 23 mounted on a shaft 24 and an annular clamp 25 selectively movable towards and away from the shoulder 23.

Figures 2, 4:
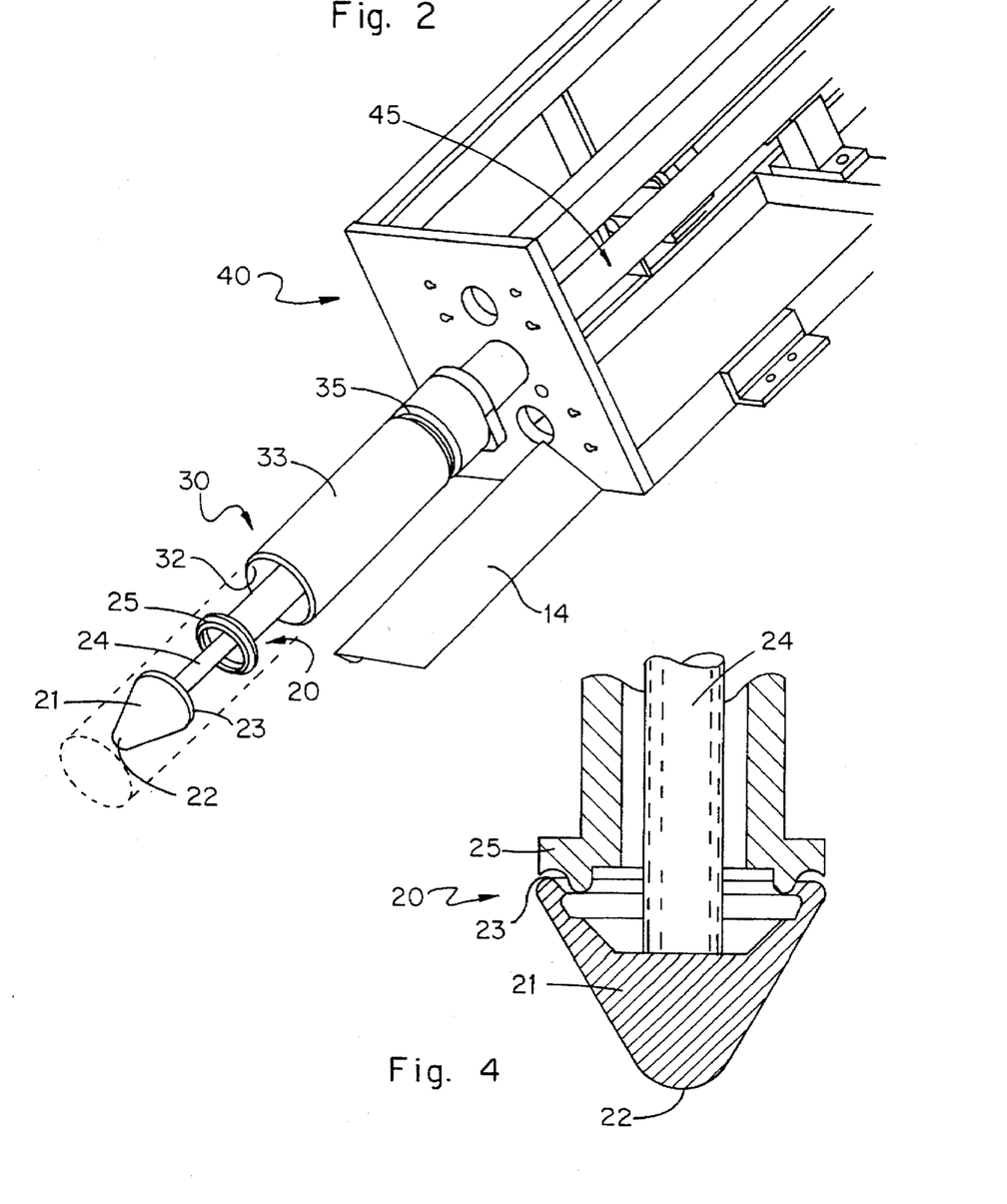
FIG. 2 shows a perspective view of a gripping apparatus and bagging means useable in the present invention.
FIG. 4 shows a cross-sectional view of a gripping apparatus according to one possible embodiment.
Figure 3:
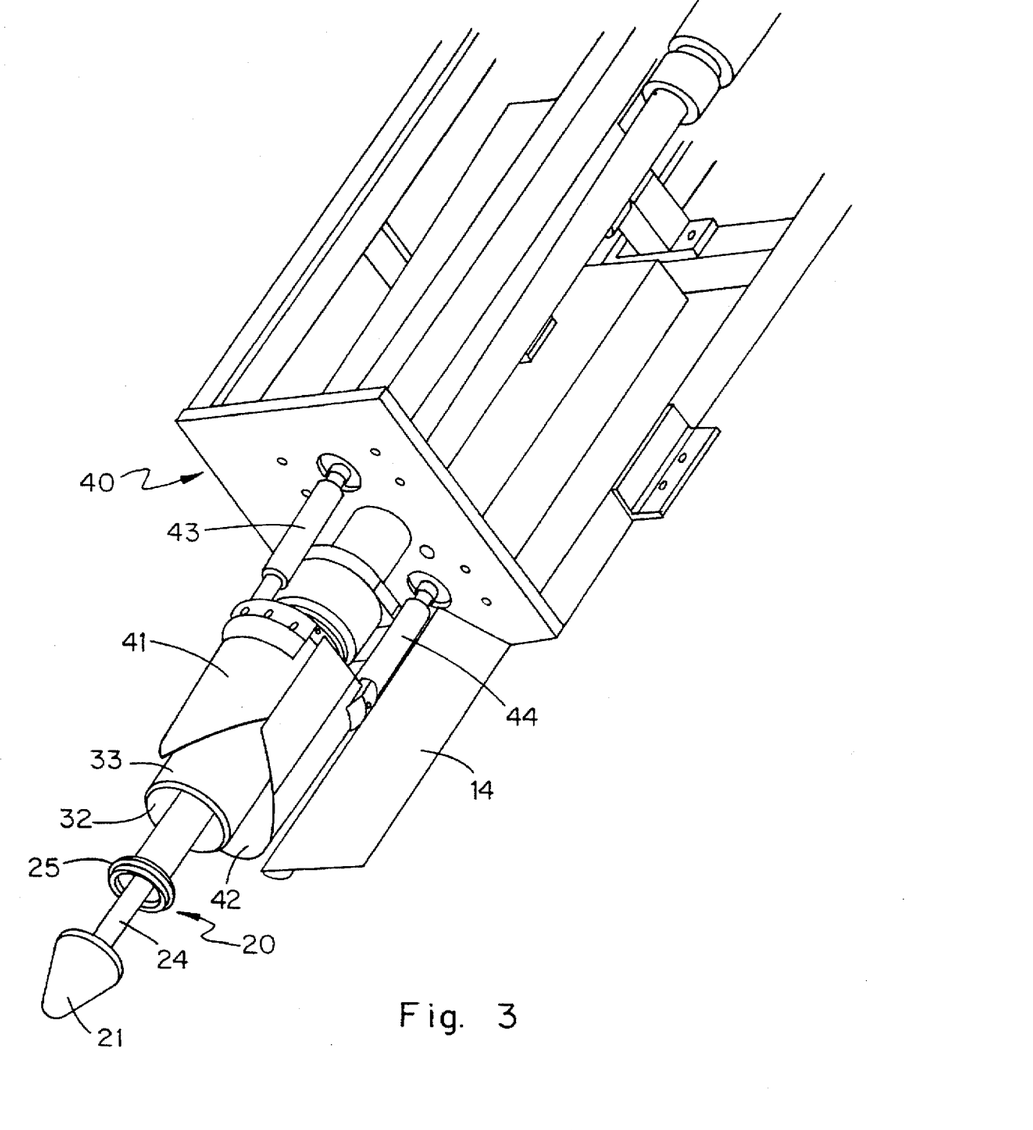
FIG. 3 is a similar view to FIG. 2 but also showing a cutting means incorporated.

Initially the clamp 25 may be closed against the shoulder 23 and the gripping means 20 is moved to a preset position and the bagging means 30 is extended, e.g to a position as shown in broken line in FIG. 2.

Figure 1A:
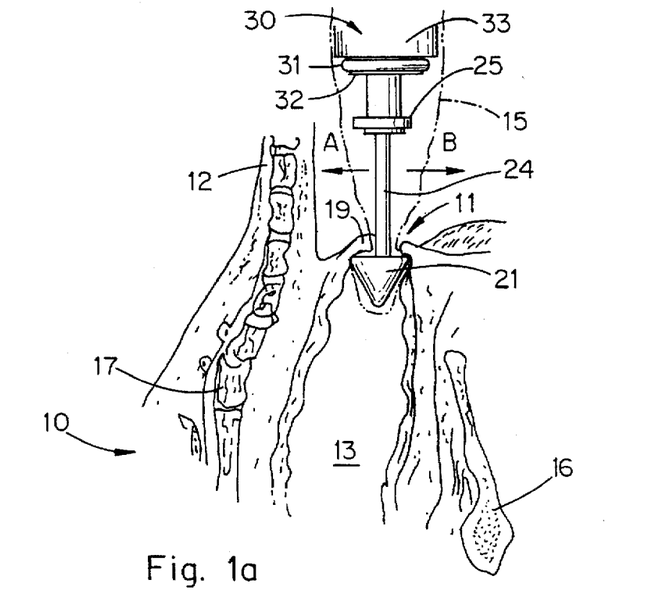
FIGS. 1a to 1f illustrate schematically a sequence of operations according to the present invention.

A ring loading device (not shown) is positioned at the front of the bagging means 30, and an elastrator sealing ring 31 is stretched and deposited onto the end of the inner tube 32 of the bagging means 30 (FIG. 1a).

The clamp 25 is opened and the gripping apparatus 20 is extended to a preset position to allow bag loading. A bag loading device (not shown) feeds a plastic bag 15 over the gripping apparatus 20 and bagging means 30. Suitable means (not shown) mounted on the bag loading device, forces the open end of the plastic bag 15 into the bag clamp 35 (FIG. 2). The bag clamp 35 closes and effectively anchors the open end of the bag 15.

As an alternative to a mechanised system for loading the elastrator ring 31 and bag 15, it will be appreciated that either or both of these loading operations could be manually performed.

The machine is now ready for the rectum separating and bagging process to begin.

The carcass 10 has preferably been prepared so that the hide is removed entirely from the carcass. The hide covering the anus 11 is skinned so that the external sphincter muscle 19 remains intact on the carcass. The carcass is suspended in a known centred position at the bagging station.

A probe (not shown) applies low voltage to the base of the tail 12, causing the tail to centralise and become erect. A tail restraint mechanism 14 applies a small downward load onto the tail to hold it in position during anus location.

The gripping apparatus 20 and bagging means 30 may be supported by an adjustable overhead support assembly 40 which can be manually positioned to locate the head 21 adjacent the anus 11. Alternatively, an automatic anus locate (not shown) locates the position of the anus 11, e.g. by analysing the profile of the carcass to locate the concavity where the anus is located, and relays the data to a Progrmmmable Logic Controller (PLC) for the apparatus.

The head 21 is then advanced and enters the anus 11 to a pre-determined position where the sphincter muscle tissues 19 have constricted behind the head 21 (FIG. 1a). In the process where the cutting of tissues around the rectum 13 is carried out manually, the application of a voltage to the base of the tail 12, the provision of the tail restraint 14, and the automatic anus locate can be omitted from the process and apparatus since the slaughterman can locate the anus 11 and rectum 13 and can control the clamping operation. The advancement of the head 21 can be manually controlled by manually positioning the carcass 10 and/or mounting assembly 40 for the head 21 and by manually initiating the head advancement, e.g. by operation of a switch.

In the mechanical cutting embodiment, the gripping apparatus 20 moves in a dorsal direction A (FIG. 1a), i.e. to the dorsal side of the pelvic cavity, until the clamp 25 contacts the carcass 10 in the approximate area of the first caudal vertebra. Integral force transducers (not shown) detect this contact and relay the information to the PLC. The gripping apparatus 20 then moves in a ventral direction B to detect resistance from the pubis 16. These two measurements set the parameters for the operation of the dorsal and ventral cutting blades 41, 42 described below.

Figure 1B:
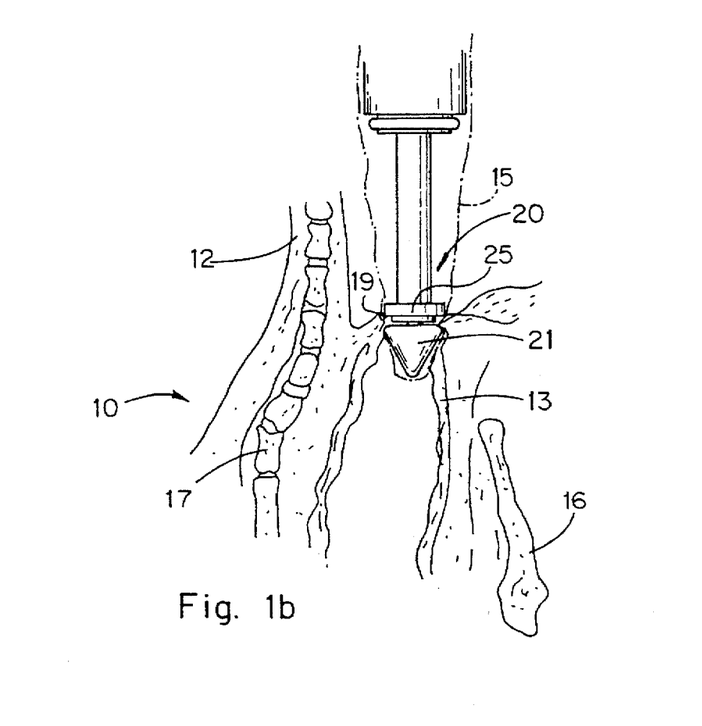

The gripping apparatus 20 is centred (manually or automatically) at the grip position (FIG. 1a) and the clamp 25 is closed, effectively gripping the anus 11, by gripping the external sphincter muscle tissues 19 between the shoulder 23 and clamp 25. The pre-applied plastic bag 15 is also clamped but not pierced (FIG. 1b).

The bagging means 30 is moved away from the carcass 10 to apply a preset load or tension to the gripped plastic bag 15, thus ensuring the bag is clear of the cutting area, i.e. where the slaughterman will be wielding the knife, or, in the mechanical cutting embodiment, in the path of the cutters 41, 42. The gripping apparatus 20 is moved away from the carcass 10 to apply tension to the bung area and straighten the rectum 13. The bagging means 30 moves proportionally to maintain bag tension (FIG. 1c).

In the manual cutting embodiment, the connective tissues around the rectum 13 are then manually cut.

In the mechanical curing embodiment, the apparatus is positioned for the dorsal cut by moving the gripping apparatus 20 in the ventral direction B by a distance determined as described above, thus moving the gripped rectum 13 in the ventral direction maximising the separation of the rectum 13 from the vertebrae 17. The arcuate dorsal cutter blade 41 is advanced by ram 43 to cut tissues in an arc around the dorsal side of the rectum 13.

Figure 1C:
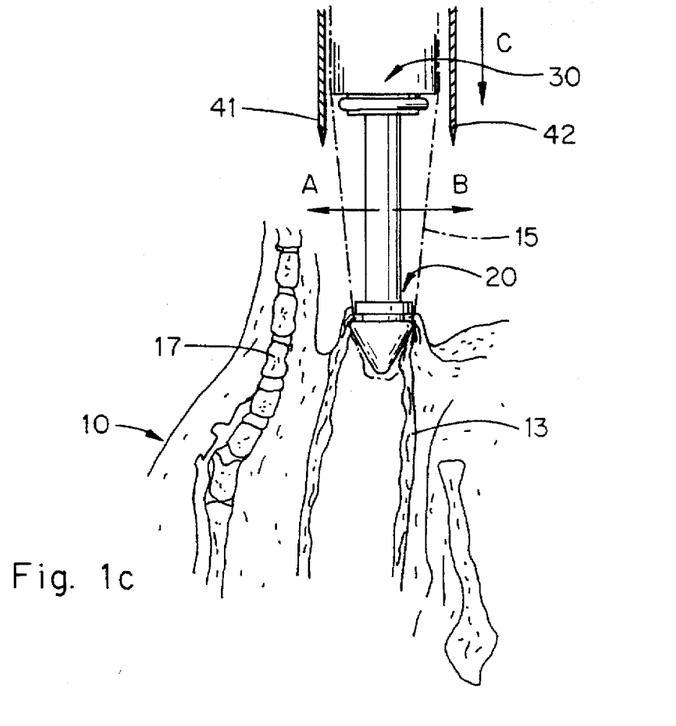

The apparatus is then positioned by dorsal displacement in direction A for the ventral cut and the ventral cutter blade 42 is advanced by ram 44 in direction C to cut tissues in an arc around the ventral side of the rectum 13 (FIG. 1c). The cutter blades 41, 42 are then withdrawn. In the manual cutting embodiment, the cutter blades 41, 42, tail restraint 14, means 43, 44 for effecting the ventral and dorsal movement are not needed and are therefore omitted from the apparatus.

Figure 1D:
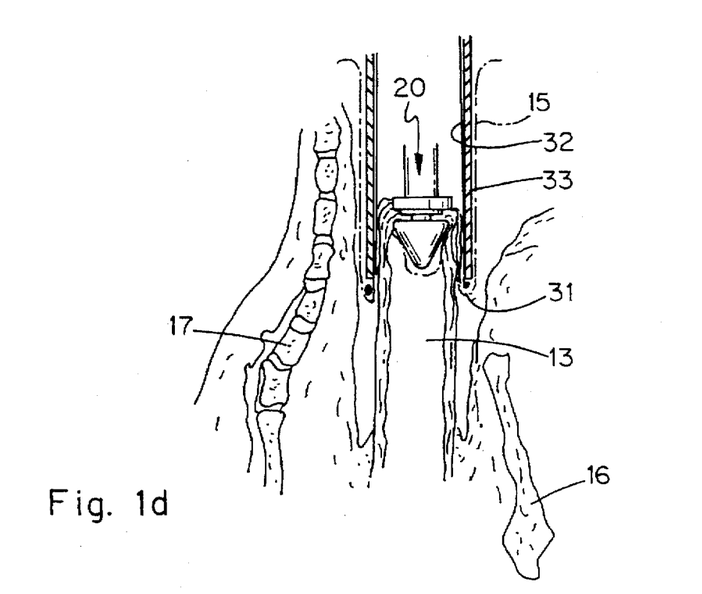

After the cutting operation, the bag clamp 35 releases the open end of the plastic bag 15. The bagging means 30 moves fully forward (FIG. 1d) and inverts the plastic bag 15 over the severed bung or terminal end section of the rectum 13 which is held in the gripping apparatus 20.

Figure 1E:
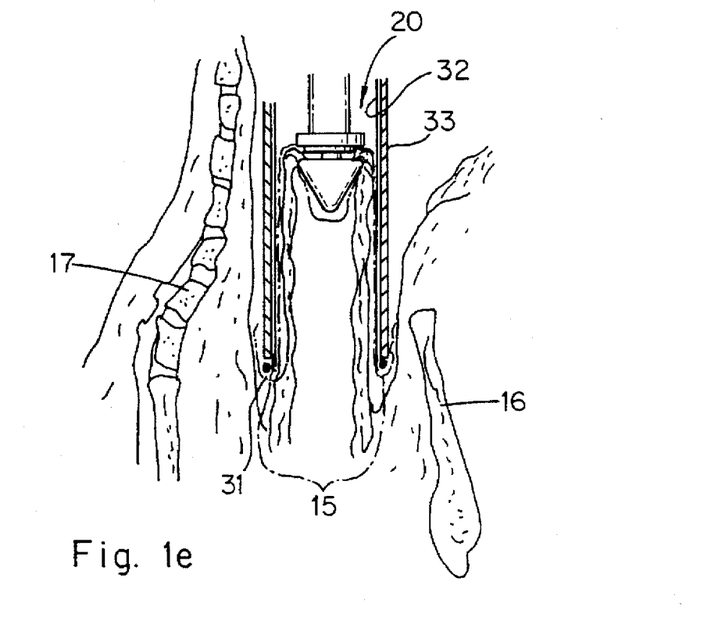
Figure 1F:
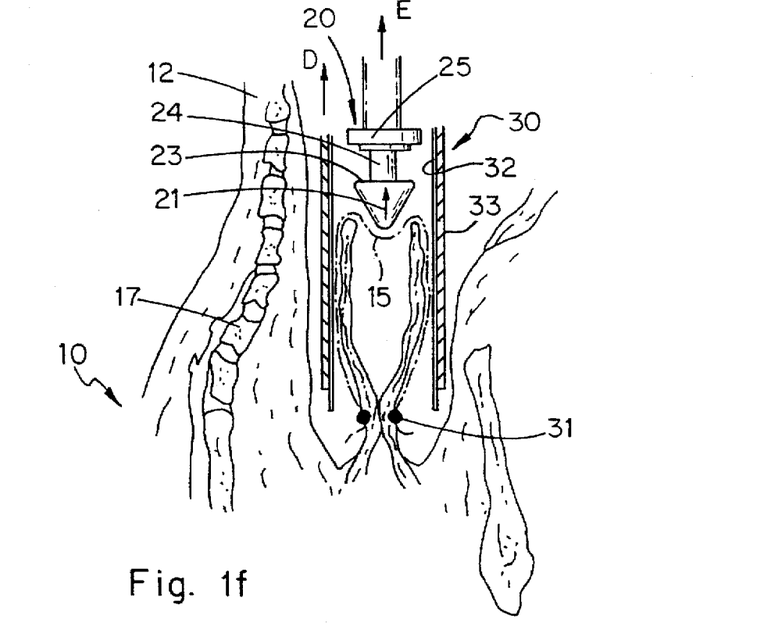

When the bagging means 30 reaches the end of its travel (FIG. 1e), a mechanical actuation (e.g. advancement of outer sleeve 33 relative to inner sleeve 32) causes the pre-applied expanded elastrator sealing ring 31 to be dislodged from the end of inner sleeve 32. The ring 31 contracts and clamps the plastic bag 15 to the severed rectum 13 (FIG. 1f). The severed rectum 13 is now completely sealed by the plastic bag 15 to a point approximately 150 mm in from the anus 11 in the case of a bovine carcass. Optionally, the bagging means 30 is withdrawn in direction D (FIG. 1f) and advancing means 45 advances the gripping apparatus 20 to push the bagged and sealed rectum 13 in the cranial direction into the pelvic cavity to a distance of approximately 600 to 700 mm. This will sever any remaining connective tissue between the rectum and the pelvis.

The clamp 25 is opened and the gripping apparatus 20 withdrawn fully from the carcass 10 in direction E (FIG. 1f). If the bagged rectum has not already been pushed deeper into the pelvic cavity, the release of the clamp 25 allows the bagged rectum to fall under gravity deeper into the pelvic cavity, particularly if the carcass is suspended by the hind legs with the animal's head down.

Figure 5:
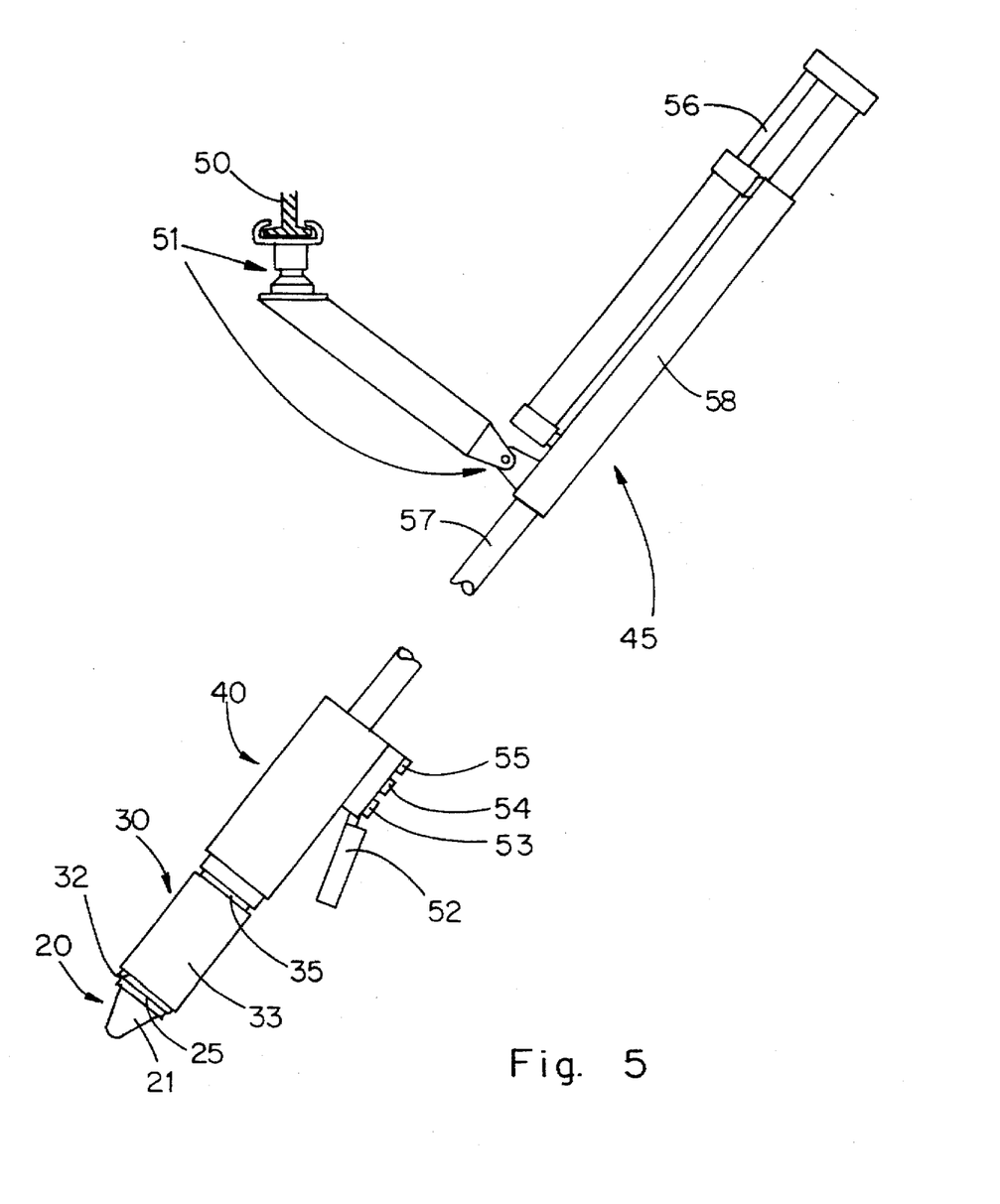
FIG. 5 shows a side view of a gripping apparatus and bagging means which is operated under manual control.

The apparatus in FIG. 5 is suitable for manual positioning and operation. The gripping apparatus 20 and bagging means 30 in FIG. 5 are constructed and operated the same as in the previously described embodiments. The cutting blades 41, 42 are not provided since the apparatus in FIG. 5 is useable with manual curing of tissues around the rectum.

The overhead support assembly 40 in FIG. 5 is suspended from part 50 of the building structure so that the entire assembly 40 can be moved linearly along the part 50 and can also be moved rotatably about joints 51 to position the gripping apparatus 20 preparatory to rectum clamping and separating. Handles 52 enable an operator to manually position the assembly. Adjacent the handles 52 there are control switches 53, 54, 55 which can be selectively operated so as to control the operation of the apparatus. Switch 53 can be operated to extend and retract the head 21 of the gripping apparatus 20 as described earlier.

Switch 54 can be operated to selectively advance and retract the entire assembly by controlling operation of the advancing means 45. In particular, the advancing means 45 comprises an advancing ram 56 which moves support arm 57 in the mounting sleeve 58 so as to thereby advance and retract the support assembly 40 and hence the gripping apparatus 20 and bagging means 30. For example, advancement of the support assembly 40 can be carried out to insert the head 21 into the rectum 13. After rectum clamping, retraction of the support assembly 40 by operation of the advancing ram 56 in the reverse direction, provides the tension to retract and straighten the rectum 13 (FIG. 1c) preparatory to manual cutting of tissues around the rectum.

After cutting of tissues around the rectum 13, the third switch 55 can be activated to advance the bagging means 30 so as to apply the bag 15 and sealing ring 31.

At the completion of the bagging operation, the gripping apparatus 20 is released and the entire assembly is retracted to remove the head 21 from the rectum 13.

The process and apparatus of the present invention have been successfully tested on both heifers and steers. The process and apparatus can enable the present manual methods of anus bunging and rectum bagging to be at least partially mechanised and possibly to a substantial extent automated, although some operations such as the initial placement of the elastrator ring 31 and closure bag 15 over the bagging means 30, and location of the anus 11 adjacent and aligned with the gripping apparatus 20, may be quickly and simply carried out manually.

In the case of manual cutting of tissues, the mechanised advancement of the head 21 into the anus 11, the closure of the clamp 25 and the retraction of the closed clamp 25 to apply tension to straighten and hold the rectum 13, and the application of the bag 15 and sealing ring 31 can be selectively initiated by the slaughterman by operating respective switches provided on the apparatus. This enables closer control of the operations to enable detection of and corrections for irregular circumstances. If desired, the apparatus can be sterilised between successive operations.

It is to be understood that various alterations, modifications and/or additions may be made to the features of the possible and preferred embodiment(s) of the invention as herein described without departing from the scope of the invention as defined in the claims.

We claim:

1. A process for separating and closing the rectum (13) of a slaughtered animal carcass (10), the process comprising the steps of:

locating a closure bag (15) over a gripping apparatus (20) so that the gripping apparatus is located in the closed end of the bag, gripping tissues (19) in the region of the anus (11) of the carcass (10) by operation of the gripping apparatus (20) acting through the bag (15) but without perforating the bag, cutting tissues around the rectum (13) to a depth inside the pelvic cavity of the carcass (10) without piercing the rectum, advancing the closure bag (15) so as to surround the rectum (13) where the tissues have been cut and constricting the bag around the rectum at a location spaced inwardly of the anus (11) so as to constrict the rectum whereby the bag encloses the anus and a terminal end section of the rectum, and releasing the gripping apparatus (20) enabling the bagged anus (11) and terminal end section of the rectum (13) to enter into the pelvic cavity of the carcass (10) for removal together with other viscera without discharge from the anus contaminating the carcass.

2. A process as claimed in claim 1 characterised in that the step of cutting tissues comprises manually cutting tissues around the rectum (13) by manual operation of a cutting tool.

3. A process as claimed in claim 1 characterised by the further step of applying longitudinal tension to the rectum (13) by partial retraction of the gripping apparatus (20) subsequent to the step of gripping tissues (19) so as to thereby straighten the path of the rectum (13) and minimise lateral movement of the rectum during the step of cutting tissues.

4. An apparatus for separating and closing the rectum (13) of a slaughtered animal carcass (10) characterised by:

a gripping apparatus (20) over which a closure bag (15) can be located so that the gripping apparatus is located at the closed end of the bag, the gripping apparatus (20) being operable to grip tissues (19) in the region of the anus (11) of the carcass (10) acting through the bag (15) but without perforating the bag, bagging means (30) for advancing the closure bag (15) so as to surround the rectum (13) where tissues around the rectum have been cut to a depth inside the pelvic cavity of the carcass without piercing the rectum, whereby the bag (15) can be constricted around the rectum (13) at a location spaced inwardly of the anus (11) so as to thereby constrict the rectum whereby the bag encloses the anus and a terminal end section of the rectum, the gripping apparatus (20) being releasable allowing the bagged anus (11) and terminal end section of the rectum (13) to enter deeper into the pelvic cavity of the carcass (10) for removal together with other viscera without discharge from the anus contaminating the carcass.

5. Apparatus as claimed in claim 4 characterised in that the gripping apparatus (20) comprises a bung member (21) and a clamp (25), the bung member being arranged to be inserted into the rectum (13) past the anus (19) to a depth so that sphincter muscle tissues (19) constrict behind the bung member (21) and the clamp (25) being advanceable from an initial retracted position to a clamping position in which it clamps the constricted sphincter muscle tissues (19) against a rear portion (23) of the bung member.

6. Apparatus as claimed in claim 5 characterised in that the bung member has a generally conical shaped head (21) having a rounded nose (22), the head being mounted on a shaft (24), the head (21) being inserted in use through the anus (11) into the rectum (13) without piercing the anal canal walls, the head of the bung member having a back face defining a shoulder (23) so that after the head (21) has been inserted to a sufficient depth into the rectum (13), the sphincter muscle tissues (19) constrict around the shaft (24) behind the shoulder (23).

7. Apparatus as claimed in claim 6 characterised in that the clamp (25) is generally annular in shape so as to clamp the constricted sphincter muscle (19) tissues against the shoulder (23) around substantially the entire periphery of the shoulder.

8. Apparatus as claimed in 5 characterised by advancing means (45) operative after the bag (15) has enclosed the anus (11) and terminal end section of the rectum (13) and has been constricted around the rectum to advance the bung member (21) and clamp (25) generally in the cranial direction so as to push the bagged anus and technical end section of the rectum (13) through the pelvic cavity towards the bulk of the abdominal viscera of the carcass.

9. Apparatus as claimed in 4 and further characterised by cutting means (41, 42) for mechanically cutting the tissues around the rectum (13) to a predetermined depth inside the pelvic cavity of the carcass (10).

10. Apparatus as claimed in claim 9 characterised in that the curing means includes a dorsal cutter (41) coaxially mounted with the gripping apparatus (20) and movable to advance past the gripping apparatus (20) without contacting the closure bag (15) so as to cut tissues of the carcass in an arc between the rectum (13) and the vertebrae (17), the cutting means also including a ventral cutter (42) movable to advance past the gripping apparatus (20) and operative to cut tissues in an arc between the rectum (13) and the pubis (16).

11. Apparatus as claimed in claim 10 characterised in that the dorsal and ventral cutters (41, 42) are advanced to perform their respective curing operations sequentially.

12. Apparatus as claimed in claim 11 characterised in that the gripping apparatus (20) is movable in the ventral direction (B) by a short distance before advancement of the dorsal cutter (41) so as to thereby move the rectum (13) in that direction (B) and increase the separation between (13) the rectum and the vertebrae (17) enabling the dorsal cutter (41) to be advanced with a reduced possibility of the dorsal cutter contacting and piercing the rectum (13) at the dorsal side of the rectum; the gripping apparatus (20) furthermore being movable in the dorsal direction (A) by a short distance before advancement of the ventral cutter (42) so as to thereby move the rectum (13) in that direction (A) and increase the separation between the rectum (13) and the pubis (16) thereby enabling the ventral cutter (42) to be advanced with a reduced possibility of the ventral cutter contacting and piercing the rectum (13) at the ventral side of the rectum.

13. Apparatus as claimed in claim 4 characterised in that the bagging means (30) surrounds the gripping apparatus (20) and locates and holds the bag (15) during the operation of the gripping apparatus (20) to grip tissues in the region of the anus (11) of the carcass (10), the bagging means (30) being advanceable past the gripping apparatus (20) and into the region where the tissues have been cut so that the bag (15) inverts as it is being advanced while the closed end of the bag remains gripped at the anus (11) by the gripping apparatus (20).

14. Apparatus as claimed in claim 13 characterised in that the bagging means (30) includes a bagging sleeve (33) coaxially mounted with the gripping apparatus (20) and mounted for selective advancing movement past the gripping apparatus, whereby the closure bag (15) can be initially located so as to enclose the gripping apparatus (20) and to extend along outside the bagging sleeve (33) with the open top of the bag (15) being clamped by a bag clamp (35) at a point along the length of the sleeve spaced from the end of the sleeve nearer the gripping apparatus (20), the bag clamp (35) being releasable when the bagging sleeve (33) is advanced to enable the bag (15) to slide back along the bagging sleeve as it is being inverted to enclose the rectum (13).

15. Apparatus as claimed in claim 13 characterised in that the bagging means (30) further includes a restricting means (32) operative to apply to the rectum a restricting device (31) to cause restriction of the rectum (13) at the point spaced from the anus (11) after the bag (15) has been located around the rectum.

16. Apparatus as claimed in claim 15 characterised in that the restricting device is a restricting ring (31) and the restricting means (32) comprises means for installing the restricting ring (31) which is initially located at the end of the bagging sleeve (33) closest to the gripping apparatus (20) when the bagging means (30) is fully retracted but which is released by the restricting means (32) when the bagging sleeve (33) is fully extended and the bag (15) is located around the anus (11) and end section of the rectum (13) so that the ring (31) thereby tightly clamps the bag to the rectum (5) and constricts the rectum at that point.

* * * * *